Patented Nov. 2, 1926.

1,605,041

UNITED STATES PATENT OFFICE.

WOLF KRITCHEVSKY, HAROLD C. PRUTSMAN, AND MABEL G. SMITH, OF CHICAGO, ILLINOIS, ASSIGNORS TO WILLIAM CITRON, TRUSTEE, OF CHICAGO, ILLINOIS.

COMBINED DYE AND POLISH FOR LEATHER.

No Drawing. Application filed October 6, 1924. Serial No. 742,062.

Our invention relates to a substance adapted to be applied to leather, particularly shoes, by one without previous skill or experience and which may be confined within a tube and be dispensed in the form of paste. We are aware that a substance having similar properties has been and is on the market in the form of a liquid in which the dye and the wax are carried in solution in a suitable solvent. The use of the material in the form of a liquid is undesirable for several reasons, and an object of our invention is to so perfect the compound that it may be sold and used in the form of a smooth, even-flowing paste, the dye being in solution and the wax being partly in solution and partly in suspension.

In order to secure the most advantageous results, it is necessary, or at least desirable, to employ two solvents, one of which is a solvent for both the dye and wax, and the other a solvent for the dye only but having the function of precipitating the wax. The proportions of the solvents relative to the other ingredients will be such that a product in the form of a paste results therefrom.

The reason for this is as follows: When the dye and the wax are both dissolved in the same solvent, then the wax carries all the dye. When the preparation is applied to the leather the wax stays on the top and holds the dye with it. When there are two solvents of which one solvent contains dye and wax and the other solvent contains dye only, the wax with some dye in it will remain on the surface of the leather, while the dye that is dissolved in the other solvent not containing the wax will penetrate into the leather and dye it.

In carrying out the invention, we employ an aniline dye such as nigrosine black, Bismarck brown, or other spirit-soluble and oil dyes of the required color, together with a material that will furnish a polish such as carnauba wax, Japan wax, bees wax, or montan wax. For a solvent that will dissolve the dye but not the wax, we may utilize commercial alcohol, cold acetone or some other similar organic liquids soluble in water. For the solvent that will dissolve both the oil and wax, we may use xylol, benzol, benzine, turpentine or some similar organic liquid insoluble in water.

A specific formula covering the preferred ingredients is as follows:

| | Per cent. |
|---|---|
| Carnauba wax | 15 |
| Paraffin wax | 55 |
| Bismarck brown | 5 |
| Xylol | 35 |
| Alcohol | 40 |

A modification may be made in which a different dye is employed as follows:

| | Per cent. |
|---|---|
| Carnauba wax | 15 |
| Montan wax | 5 |
| Oil black | 10 |
| Turpentine | 30 |
| Acetone | 40 |

It will be understood that in the above formulæ, the alcohol or acetone acts as a solvent for the dye only, and serves to precipitate a portion of the wax in finely divided form, thus producing the thickened or pasty condition required.

In practice, the waxes and the dye are first melted and thereafter the specified proportion of xylol is added. The solids enter into the solution and thereafter, while the mixture is still warm, the alcohol is added. This results in precipitating a certain quantity of the waxes, and as the substance cools, it is in the form of a smooth colloidal paste and is ready to be placed in the tubes.

By combining the necessary ingredients with a plurality of solvents having different properties, we are able to produce a smooth paste which may be applied directly to the leather without running and which will have the function of immediately releasing the dye and depositing it on the leather, the solvent partly vaporizing and partly entering the leather, the major portion of the wax remaining on the surface. Sufficient dye is in solution with the solvent for the wax to color the wax, but the bulk of the dye is but loosely held in the compound and will attach itself immediately to the leather. The wax, being partly in solution, partly in suspension and partly in the form of a precipitate, remains on the surface where it covers the pores of the leather and provides an effective polish.

By following the instructions given herein, a combined dye and polish may be prepared in much more concentrated form than is possible in the case of a liquid. The substance may be dispensed in small tubes and not be subject to breakage and consequent damage to clothing or furnishings.

We claim:

1. A dye and polish in the form of a paste that may be dispensed from a tube, consisting of dye in quantity sufficient to dye leather and wax, and a plurality of solvents one of which solvents is not a solvent for the wax.

2. A combined dye and polish in the form of a smooth paste, consisting of aniline dye in quantity sufficient to dye leather, wax, a solvent that will dissolve the dye that is not a solvent for the wax, and a second solvent that will dissolve both the dye and the wax.

3. A new composition of matter composed of dye in quantity sufficient to dye leather and wax, a solvent that will dissolve both the dye and the wax, and a second solvent for the dye that will precipitate the wax.

4. A combined dye and polish in the form of a paste, consisting of dye in quantity sufficient to dye leather, wax, alcohol and a solvent that will dissolve both the dye and the wax.

Signed at Chicago, Ill., this 30th day of September, 1924.

WOLF KRITCHEVSKY.
HAROLD C. PRUTSMAN.
MABEL G. SMITH.